US012567161B2

(12) United States Patent
Banerjee et al.

(10) Patent No.: US 12,567,161 B2
(45) Date of Patent: Mar. 3, 2026

(54) METHODS AND APPARATUS FOR OCCLUSION HANDLING TECHNIQUES

(71) Applicant: QUALCOMM Incorporated, San Diego, CA (US)

(72) Inventors: Sudipto Banerjee, Bangalore (IN); Vinay Melkote Krishnaprasad, Bangalore (IN); Sandeep Kanakapura Lakshmikantha, Bangalore (IN); Ajit Venkat Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 17/907,535

(22) PCT Filed: Apr. 28, 2021

(86) PCT No.: PCT/US2021/029657
§ 371 (c)(1),
(2) Date: Sep. 27, 2022

(87) PCT Pub. No.: WO2021/247171
PCT Pub. Date: Dec. 9, 2021

(65) Prior Publication Data
US 2023/0147244 A1 May 11, 2023

(30) Foreign Application Priority Data
Jun. 1, 2020 (IN) .............................. 202041022961

(51) Int. Cl.
*G06T 7/50* (2017.01)
*G06T 7/10* (2017.01)
(Continued)

(52) U.S. Cl.
CPC .................. *G06T 7/50* (2017.01); *G06T 7/10* (2017.01); *G06T 7/20* (2013.01); *G06T 15/503* (2013.01); *G06T 2207/30041* (2013.01)

(58) Field of Classification Search
CPC .... G06T 7/50; G06T 7/10; G06T 7/20; G06T 15/503; G06T 2207/30041; G06T 15/506;
(Continued)

(56) References Cited

U.S. PATENT DOCUMENTS 10,682,108 B1 * 6/2020 Ma ................... A61B 1/000096
11,127,148 B1 * 9/2021 Edmonds ............. H04N 13/128
(Continued)

FOREIGN PATENT DOCUMENTS

EP          2731080 A1      5/2014
WO     2015192117 A1     12/2015

OTHER PUBLICATIONS

International Search Report and Written Opinion—PCT/US2021/029657—ISA/EPO—Jul. 20, 2021.
(Continued)

*Primary Examiner* — Sarah Lhymn
(74) *Attorney, Agent, or Firm* — Arent Fox Schiff LLP

(57) ABSTRACT

The present disclosure relates to methods and apparatus for graphics processing. The apparatus can determine a combined depth map based on at least one of a 3DRU mesh, a DFS map, and a display pose. The apparatus can also determine one or more re-projected eye and depth buffers based on at least one of one or more eye buffers, one or more depth buffers, one or more bounding box and warp parameters, and the display pose. Further, the apparatus can communicate at least one composited frame based on the combined depth map and the one or more re-projected eye and depth buffers. The apparatus can also determine the at least one composited frame based on the combined depth
(Continued)

map and the one or more re-projected eye and depth buffers. The apparatus can also combine the 3DRU mesh, the DFS map, and the display pose.

30 Claims, 11 Drawing Sheets

(51) Int. Cl.
    *G06T 7/20*            (2017.01)
    *G06T 15/50*         (2011.01)

(58) Field of Classification Search
    CPC ... G06T 2207/10028; G06T 5/50; G06T 5/77;
                G06T 15/40; G06T 19/006; H04N
                           13/128; H04N 2013/0081
    See application file for complete search history.

(56) References Cited

U.S. PATENT DOCUMENTS

| | | | | |
|---|---|---|---|---|
| 2009/0284529 | A1* | 11/2009 | De Aguiar | G06T 7/251 |
| | | | | 345/474 |
| 2012/0081357 | A1* | 4/2012 | Habbecke | G06T 17/20 |
| | | | | 345/419 |
| 2012/0185094 | A1* | 7/2012 | Rosenstein | B25J 5/007 |
| | | | | 901/1 |
| 2013/0226344 | A1* | 8/2013 | Wong | G05D 1/0242 |
| | | | | 901/1 |
| 2013/0271566 | A1* | 10/2013 | Chen | H04N 19/176 |
| | | | | 348/43 |
| 2014/0092978 | A1* | 4/2014 | Bugdayci | H04N 19/30 |
| | | | | 375/240.16 |
| 2014/0098883 | A1* | 4/2014 | Hannuksela | H04N 19/597 |
| | | | | 375/240.12 |
| 2014/0340489 | A1* | 11/2014 | Medioni | G06V 20/64 |
| | | | | 348/50 |
| 2014/0355685 | A1* | 12/2014 | Chen | H04N 19/52 |
| | | | | 375/240.16 |
| 2015/0103906 | A1* | 4/2015 | Zhao | H04N 19/593 |
| | | | | 375/240.12 |
| 2015/0172717 | A1* | 6/2015 | Zhao | H04N 19/11 |
| | | | | 375/240.16 |
| 2015/0201212 | A1* | 7/2015 | Zhang | H04N 19/577 |
| | | | | 375/240.15 |
| 2016/0012633 | A1* | 1/2016 | Wei | G06T 7/33 |
| | | | | 345/420 |
| 2016/0148429 | A1* | 5/2016 | Groppa | G09G 5/026 |
| | | | | 345/419 |
| 2017/0091996 | A1* | 3/2017 | Wei | G06T 17/20 |
| 2018/0114264 | A1 | 4/2018 | Rafii et al. | |
| 2018/0139431 | A1* | 5/2018 | Simek | H04N 13/271 |
| 2018/0255283 | A1 | 9/2018 | Li et al. | |
| 2019/0197786 | A1 | 6/2019 | Molyneaux et al. | |
| 2019/0213778 | A1* | 7/2019 | Du | G06T 15/04 |
| 2020/0394759 | A1* | 12/2020 | Luo | G06T 5/60 |
| 2021/0142497 | A1* | 5/2021 | Pugh | G06T 7/194 |
| 2021/0279904 | A1* | 9/2021 | Sinha | G06T 9/002 |

OTHER PUBLICATIONS

Peter H.E.D., et al., "Viewpoint-Free Photography for Virtual Reality", Abreu Pedro Henriques Pha @ Dei Uc Pt University Of Coimbra Coimbra Portugal, Mar. 3, 2020 (Mar. 3, 2020). Advances In Intelligent Data Analysis XIX; [Lecture Notes In Computer Science, LECT, Notes Computer], Springer International Publishing, CHAM, pp. 132-166, XP047545555, 35 Pages, ISSN: 0302-9743 ISBN: 978-3-030-71592-2. [Retrieved on Mar. 3, 2020] p. 152.

\* cited by examiner

100

METHODS AND APPARATUS FOR OCCLUSION HANDLING TECHNIQUES

CROSS REFERENCE TO RELATED APPLICATION(S)

This application is a National Phase entry of PCT Application No. PCT/US2021/029657, entitled "METHODS AND APPARATUS FOR OCCLUSION HANDLING TECHNIQUES" and filed on Apr. 28, 2021, which claims priority to Indian Application No. 202041022961, entitled "METHODS AND APPARATUS FOR OCCLUSION HANDLING TECHNIQUES" and filed on Jun. 1, 2020, all of which are expressly incorporated by reference herein in their entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit, a graphics processing unit, a display processing unit (DPU), a re-projection module, a depth combiner, a compositor, or any apparatus that can perform graphics processing. The apparatus can combine a three-dimensional (3D) reconstruction and understanding (3DRU) mesh, a depth from stereo (DFS) map, and a display pose. The apparatus can also determine a combined depth map based on at least one of the 3DRU mesh, the DFS map, and the display pose. Further, the apparatus can calculate one or more bounding box and warp parameters. The apparatus can also encode at least one of one or more eye buffers or one or more depth buffers. The apparatus can also decode at least one of one or more eye buffers or one or more depth buffers. Moreover, the apparatus can combine the one or more eye buffers, the one or more depth buffers, the one or more bounding box and warp parameters, and the display pose. The apparatus can also determine one or more re-projected eye and depth buffers based on at least one of the one or more eye buffers, the one or more depth buffers, the one or more bounding box and warp parameters, and the display pose. Additionally, the apparatus can calculate at least one of visible geometry or a shaded texture. The apparatus can also determine the at least one composited frame based on the combined depth map and the one or more re-projected eye and depth buffers. The apparatus can also communicate at least one composited frame, the at least one composited frame being based on the combined depth map and the one or more re-projected eye and depth buffers.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
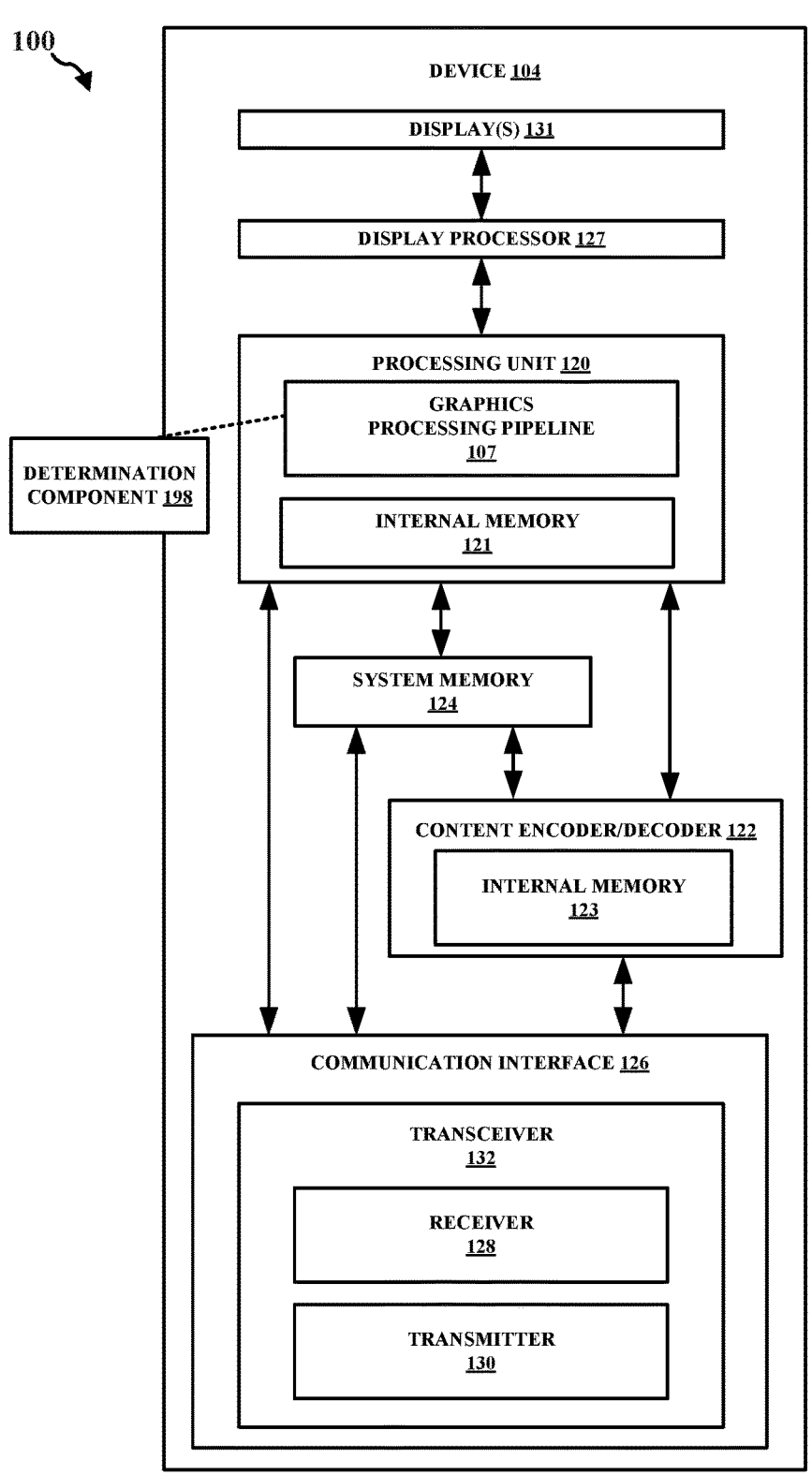
FIG. 1 is a block diagram that illustrates an example content generation system in accordance with one or more implementations of the present disclosure.

In augmented reality (AR), it can be important to handle occlusions between real and virtual objects properly for a more immersive experience, as well as seamless interactions with the environment. Without occlusion handling, virtual objects may appear to be pasted on the real world. Quality of occlusion handling may depend on a number of factors.

For instance, the quality of occlusion handling may depend on how well the scene is modeled. In some instances, a three-dimensional reconstruction and understanding can provide a reconstructed mesh of the real world as the AR device scans the scene. This may also provide a quality of depth estimates of the real world. There are a number of present issues with occlusion handling. For example, the 3DRU mesh may not be available immediately after the application is started. Also, the depth map obtained from a 3DRU scene mesh can be relatively clean, but it may not capture dynamic objects. Depth estimates from stereo camera frames may capture dynamic objects, but they can be noisy and may not be available at display refresh rate. Aspects of the present disclosure can combine a 3DRU depth and/or a depth from stereo in order to obtain a more reliable depth map, which can capture both static and dynamic objects in real world. For instance, aspects of the present disclosure can include a re-projection module, a depth combiner, and/or a compositor in order to effectively capture static and dynamic objects in real world. By doing so, aspects of the present disclosure can result in a combined depth map, re-projected eye and depth buffers, and/or a composited frame.

Various aspects of systems, apparatuses, computer program products, and methods are described more fully hereinafter with reference to the accompanying drawings. This disclosure may, however, be embodied in many different forms and should not be construed as limited to any specific structure or function presented throughout the present disclosure. Rather, these aspects are provided so that the present disclosure will be thorough and complete, and will fully convey the scope of the present disclosure to those skilled in the art. Based on the teachings herein one skilled in the art should appreciate that the scope of the present disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of the present disclosure. Although some potential benefits and advantages of aspects of the present disclosure are mentioned, the scope of the present disclosure is not intended to be limited to particular benefits, uses, or objectives. Rather, aspects of the present disclosure are intended to be broadly applicable to different wireless technologies, system configurations, networks, and transmission protocols, some of which are illustrated by way of example in the figures and in the following description. The detailed description and drawings are merely illustrative of the present disclosure rather than limiting, the scope of the present disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout the present disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term "application" may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in the present disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, the present disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, the present disclosure describes techniques for graphics processing in any device that utilizes graphics processing. Other example benefits are described throughout the present disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of the present disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of the present disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit, a graphics processing unit, a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of the present disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of the present disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to combine a three-dimensional reconstruction and understanding mesh, a depth from stereo map, and a display pose. The determination component 198 can also be configured to determine a combined depth map based on at least one of the 3DRU mesh, the DFS map, and the display pose. The determination component 198 can also be configured to calculate one or more bounding box and warp parameters. The determination component 198 can also be configured to encode at least one of one or more eye buffers or one or more depth buffers. The determination component 198 can also be configured to decode at least one of one or more eye buffers or one or more depth buffers. The determination component 198 can also be configured to combine the one or more eye buffers, the one or more depth buffers, the one or more bounding box and warp parameters, and the display pose. The determination component 198 can also be configured to determine one or more re-projected eye and depth buffers based on at least one of the one or more eye buffers, the one or more depth buffers, the one or more bounding box and warp parameters, and the display pose. In some aspects, the re-projected eye and depth buffers may be a function of the display pose. The determination component 198 can also be configured to calculate at least one of visible geometry or a shaded texture. The determination component 198 can also be configured to determine the at least one composited frame based on the combined depth map and the one or more re-projected eye and depth buffers. The determination component 198 can also be configured to communicate at least one composited frame, the at least one composited frame being based on the combined depth map and the one or more re-projected eye and depth buffers.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may change the corresponding context. Additionally, the workload that corresponds to the mode or state may follow the changing mode or state.

Figure 2:
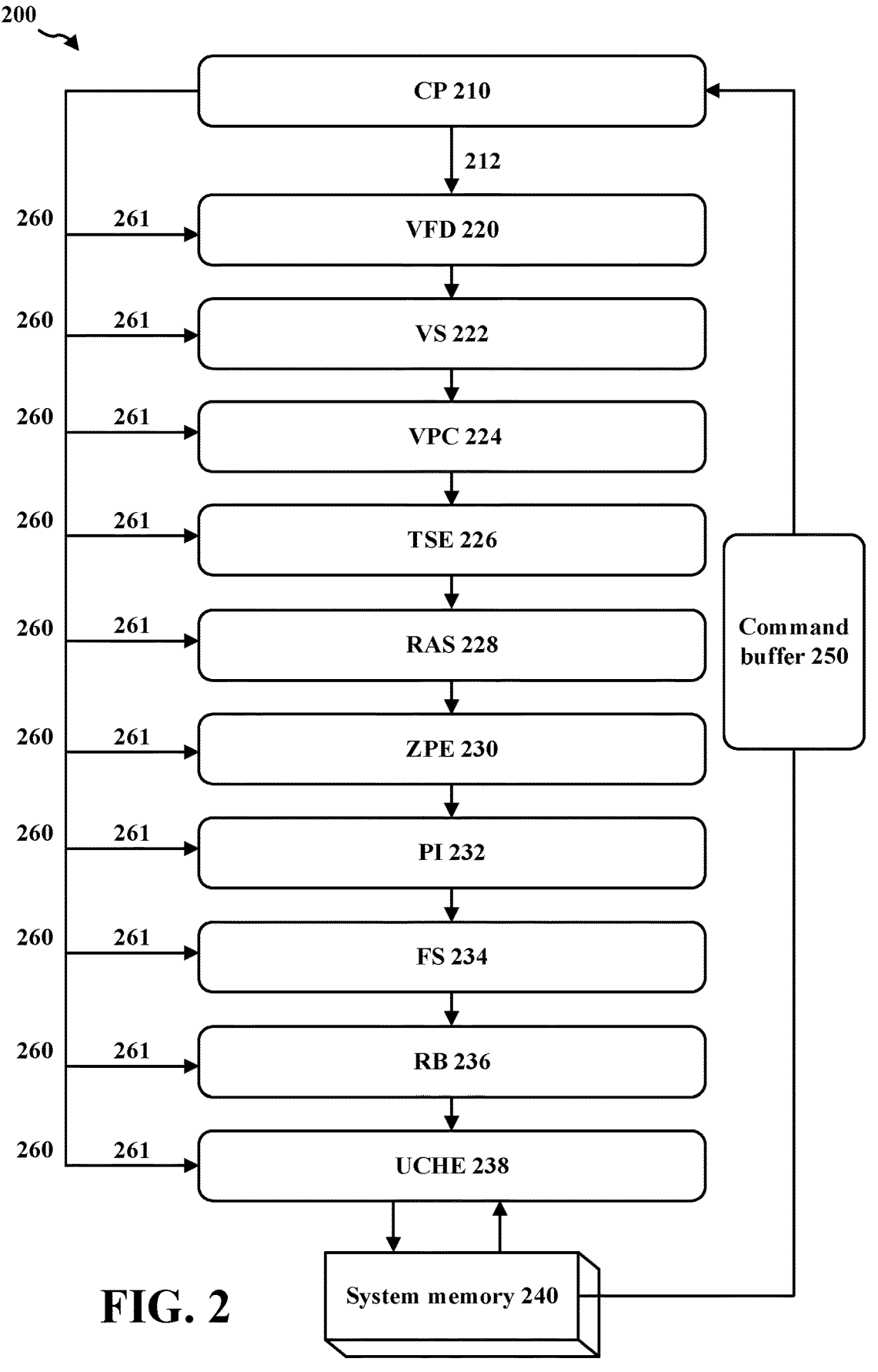
FIG. 2 illustrates an example GPU in accordance with one or more techniques of the present disclosure.

FIG. 2 illustrates an example GPU 200 in accordance with one or more techniques of the present disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

In AR, it can be important to handle occlusions between real and virtual objects properly for a more immersive experience, as well as seamless interactions with the environment. Without occlusion handling, virtual objects may appear to be pasted on the real world. Quality of occlusion handling may depend on a number of factors. For instance, the quality of occlusion handling may depend on how well the scene is modelled. In some instances, a three-dimensional reconstruction and understanding can provide a reconstructed mesh of the real world as the AR device scans the scene. This may also provide a quality of depth estimates of the real world.

There are a number of present issues with occlusion handling. For example, the 3DRU mesh may not be available immediately after the application is started. Also, the depth map obtained from a 3DRU scene mesh can be relatively clean, but it may not capture dynamic objects. For example, the 3DRU service may aggregate measurements over time, providing clean image data of static objects. Depth estimates from stereo camera frames may capture dynamic objects, but they can be noisy and may not be available at display refresh rate. As such, there is a present need to combine a 3DRU depth and/or a depth from stereo in order to obtain a more reliable depth map, which can capture both static and dynamic objects in real world.

Aspects of the present disclosure can combine a 3DRU depth and/or a depth from stereo in order to obtain a more reliable depth map, which can capture both static and dynamic objects in real world. For instance, aspects of the present disclosure can include a re-projection module, a depth combiner, and/or a compositor in order to effectively capture static and dynamic objects in real world. By doing so, aspects of the present disclosure can result in a combined depth map, re-projected eye and depth buffers, and/or a composited frame.

Figure 3:
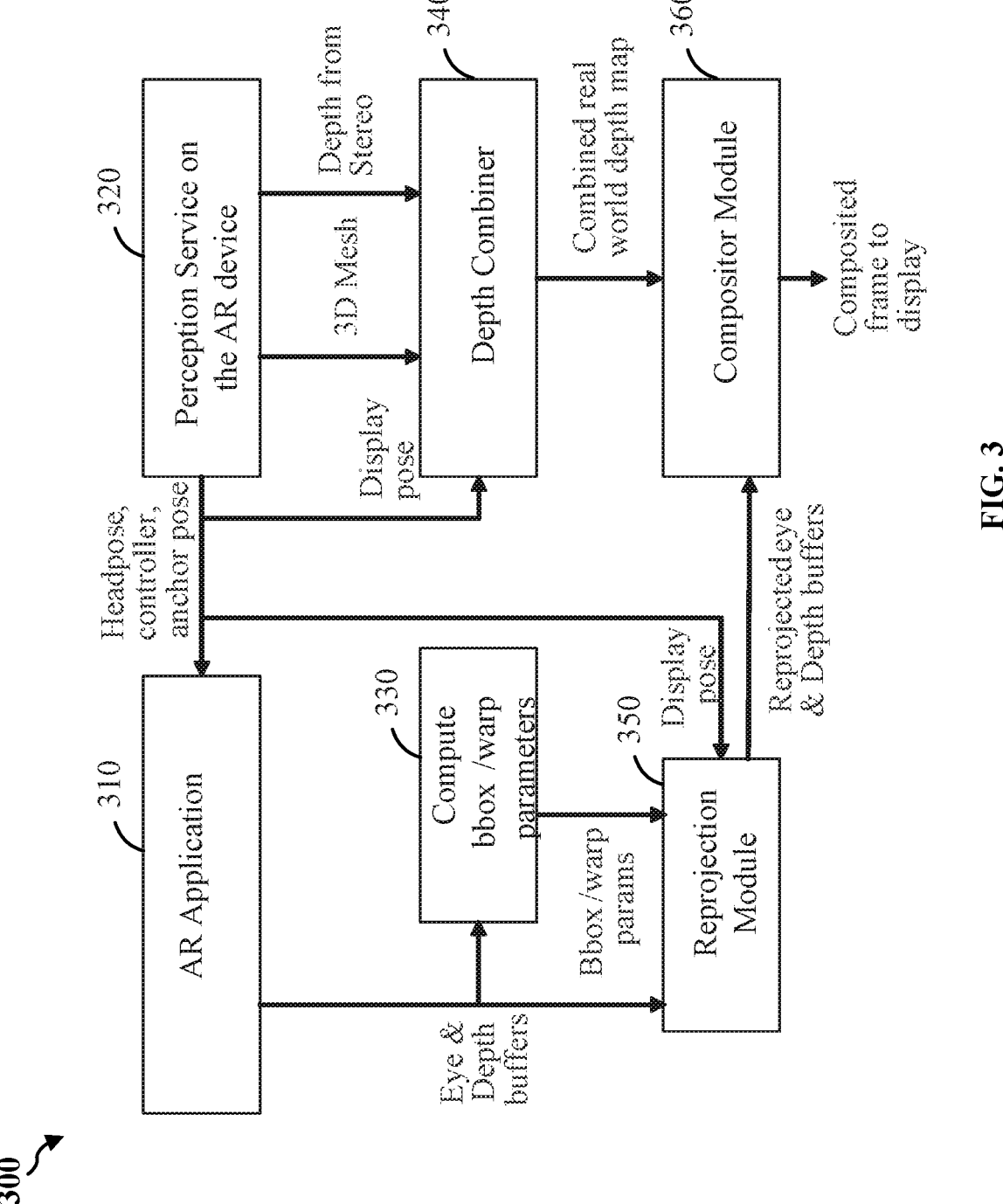
FIG. 3 illustrates an example diagram including an occlusion handling technique in accordance with one or more implementations of the present disclosure.

FIG. 3 illustrates diagram 300 including an occlusion handling technique in accordance with one or more implementations of the present disclosure. As shown in FIG. 3, diagram 300 includes a number of components, such as an AR application component 310, a perception service on the AR device component 320, a compute bounding box (bbox) and warp parameters component 330, a depth combiner 340, a re-projection module 350, and a compositor module 360. The perception service on the AR device component 320 can communicate a headpose, controller, or anchor pose to the AR application 310, and can communicate a display pose, a 3D mesh, and a DFS map to the depth combiner 340. The depth combiner 340 can communicate a combined real world depth map to the compositor module 360. The AR application 310 can communicate eye and depth buffers to the compute bounding box and warp parameters component 330 as well as to the re-projection module 350. The compute bounding box and warp parameters component 330 can communicate the bbox and warp parameters to the re-projection module 350, the re-projection module can communicate a re-projected eye and depth buffers to the compositor module 360. Also, the compositor module 360 can communicate a composited frame to a display (not shown).

As shown in FIG. 3, a 3DRU service on an AR device can create 3D mesh of real world scene by integrating several depth maps obtained from stereo frames. This can be relatively clean but may not capture dynamic real world objects. In some instances, depth maps from stereo frames may be noisy but capture dynamic objects. The depth combiner 340 may combine depth maps from 3DRU and stereo frames to produce a cleaner and filtered depth map re-projected at display pose. Also, eye buffers and depth buffers rendered by the AR application 310 can be re-projected to the display pose by the re-projection module 350. The compositor module 360 can augment rendered virtual objects on the real world by combining virtual depth and depth map obtained from the depth combiner 340. Additionally, the resulting composited frame can be communicated to the display.

Figure 4:
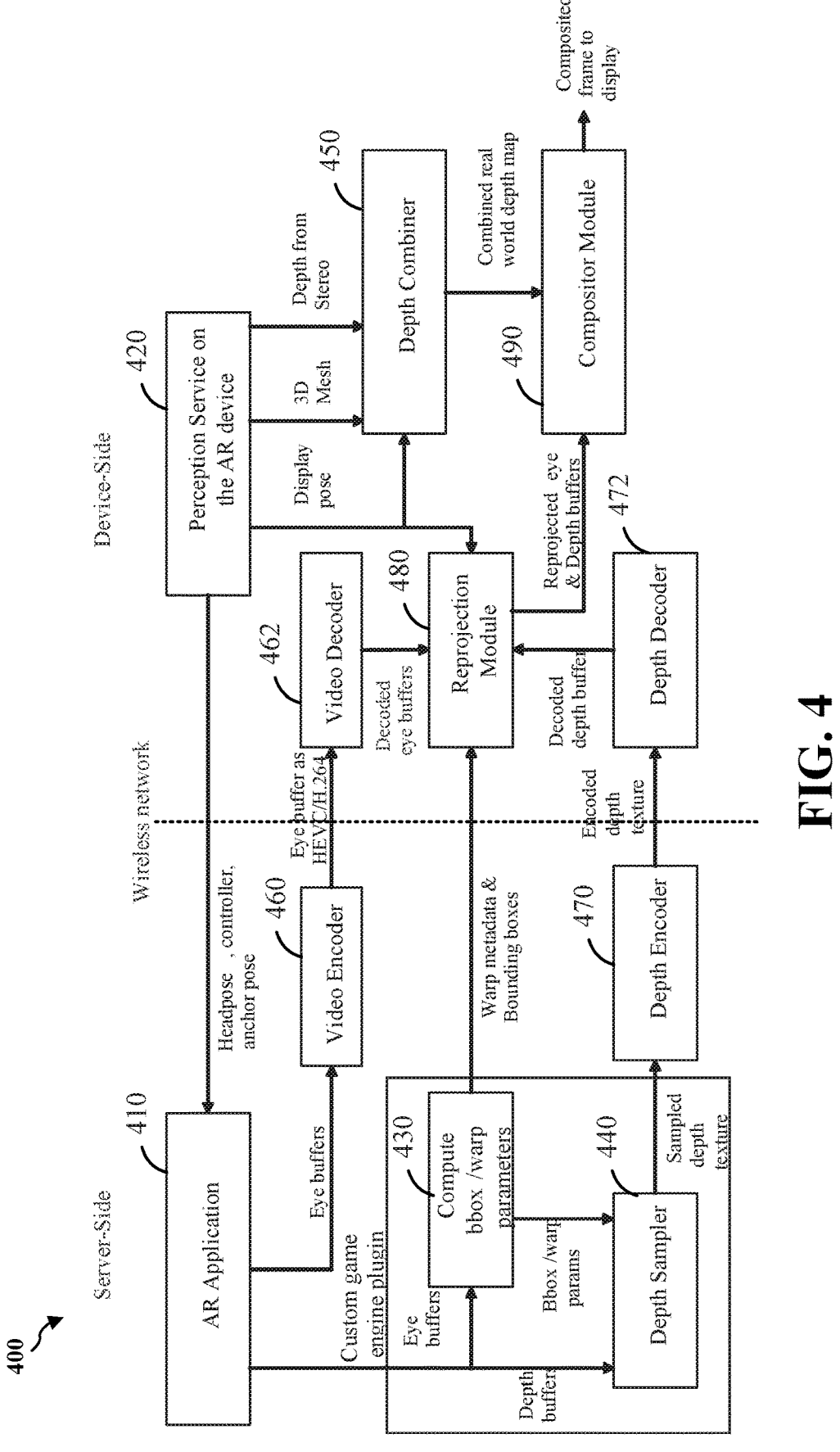
FIG. 4 illustrates an example diagram including an occlusion handling technique in accordance with one or more implementations of the present disclosure.

FIG. 4 illustrates diagram 400 including an occlusion handling technique in accordance with one or more implementations of the present disclosure. As shown in FIG. 4, diagram 400 includes an AR application component 410, a perception service on the AR device component 420, a compute bounding box and warp parameters component 430, a depth sampler 440, a depth combiner 450, a video encoder 460, a video decoder 462, a depth encoder 470, a depth decoder 472, a re-projection module 480, and a compositor module 490. As shown in FIG. 4, in some AR use cases, the rendering may be split between a server, e.g., a phone or edge server, and an AR client device connected by a wire or wireless connection to the server. As shown in FIG. 4, in split AR use cases, the server may include the AR application component 410, compute bounding box and warp parameters component 430, depth sampler 440, video encoder 460, and depth encoder 470. The AR client device may include the perception service on the AR device component 420, depth combiner 450, video decoder 462, depth decoder 472, re-projection module 480 and the compositor module 490. The perception service on the AR device component 420 on the device-side can communicate a headpose, controller, or anchor pose to the AR application component 410 on the server-side via the wireless network. The compute bounding box and warp parameters component 430 on the server-side may send bounding boxes and warp metadata to the re-projection module 480 on the device-side via the wireless network as well as to the depth sampler 440 on the server-side. The depth sampler 440 may provide a sampled depth texture to the depth encoder 470. In some aspects, the depth sampler 440 can help reduce the depth buffer size based on a sampling depth data within certain bounding boxes. The depth sampler 440 may be part of the depth encoder 470 in some implementations, or may be separate from the depth encoder 470 in other implementations. The depth encoder 470 on the server-side may send encoded depth buffers to the depth decoder 472 on the device-side via the wireless network. The video encoder 460 on the server-side may send encoded eye buffers to the video decoder 462 on the device-side via the wireless network. Also, the depth texture may be sampled and encoded in order to reduce transport bandwidth. Alternatively, in some implementations, the depth buffer may be omitted, of which 3D plane data can be generated relative to (or within) a bounding box irrespective of the need to obtain or use depth buffer data. As such, the 3D plane data can include a representation of the depth buffer data.

Figure 5:
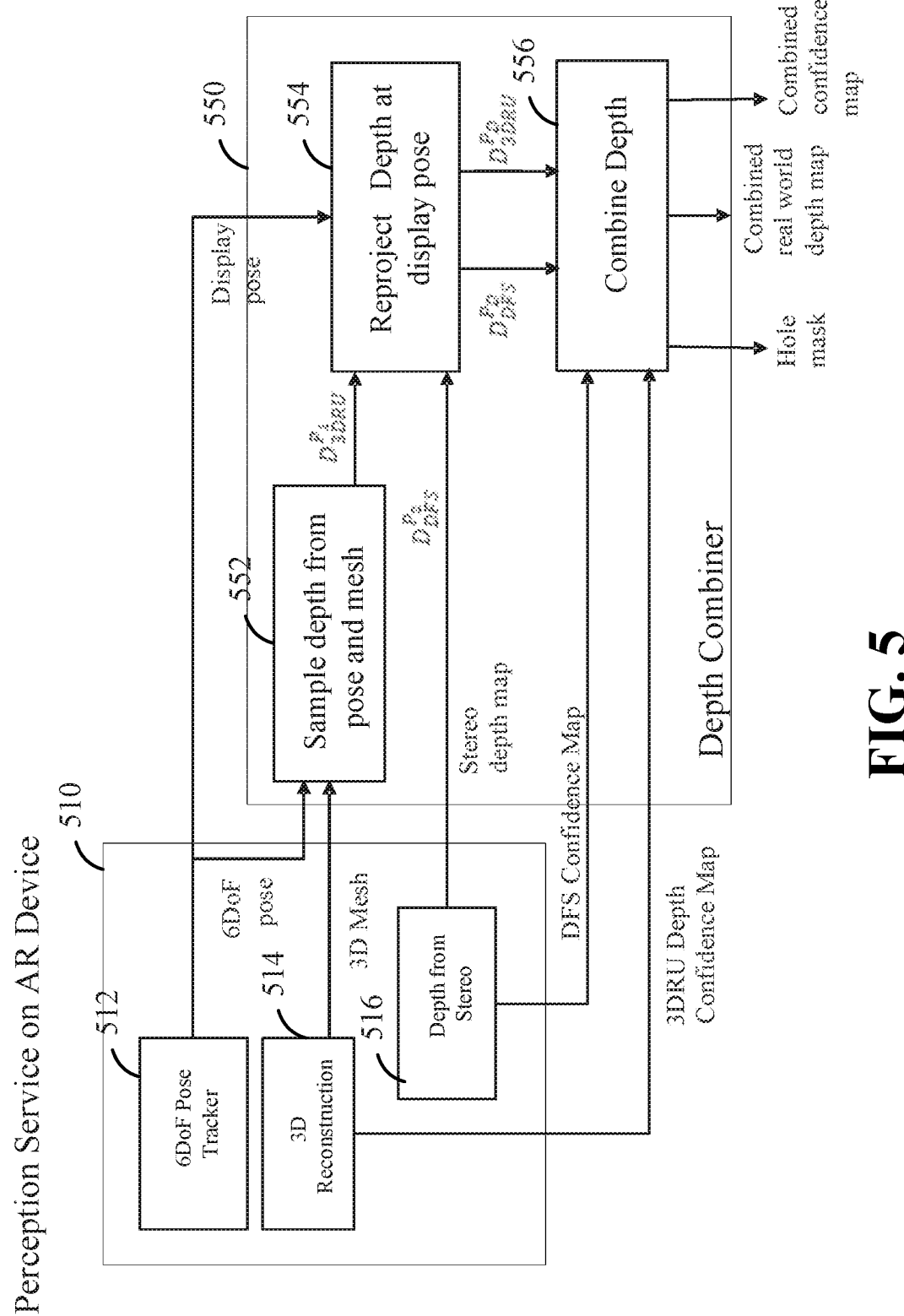
FIG. 5 illustrates an example diagram including an occlusion handling technique in accordance with one or more implementations of the present disclosure.

FIG. 5 illustrates diagram 500 including an occlusion handling technique in accordance with one or more implementations of the present disclosure. As shown in FIG. 5, diagram 500 includes a perception service on AR device 510 and a depth combiner 550. The perception service on AR device 510 includes a six-degree of freedom (6DoF) pose tracker 512, a 3D reconstruction component 514, and a DFS component 516. The depth combiner 550 includes a sample depth from pose and mesh component 552, a re-project depth at display pose component 554, and a combine depth component 556. As shown in FIG. 5, the 6DoF pose tracker 512 provides a 6DoF pose to the sample depth from pose and mesh component 552 and a display pose signal to the re-project depth at display pose component 554. The 3D reconstruction component 514 provides a 3D mesh signal to the sample depth from pose and mesh component 552 and a 3DRU depth confidence map to the combine depth component 556. The DFS component 516 provides a stereo depth map to the re-project depth at display pose component 554 and a DFS confidence map the combine depth component 556. The depth combiner 550 uses the 3DRU mesh, stereo depth map and 6DoF poses from the perception service on AR device 510 and produces a combined real world depth map, which captures both static and dynamic objects. The depth combiner 550 can also produce a hole mask. As such, pixels whose depth values cannot be estimated with confidence from either 3DRU depth or DFS depth may be denoted as holes.

As shown in FIG. 5, $D_{DFS}{}^{P2}$ may correspond to a DFS depth map obtained from pose $P_2$. Also, $D_{3DRU}{}^{P1}$ may correspond to a 3DRU depth map obtained from pose $P_1$. Additionally, $D_{DFS}{}^{Pp}$ and $D_{3DRU}{}^{Pp}$ may correspond to a DFS and 3DRU depth map re-projected to pose $P_D$.

Aspects of the present disclosure can assume perception service provides a confidence measure for each depth sample obtained from 3DRU and DFS. The depth combiner 550 may also produce a combined confidence map, which captures confidence measures from both depth maps. In some aspects, the DFS and 3DRU may run at lower frames per second (fps). Depth maps can be potentially sampled from two different poses, as well as be re-projected to the same display pose.

The depth maps can be combined in a number of different ways, such as based on a difference in depth values. For instance, if a difference in depth values for a pixel is less than some value, e.g., $\varepsilon$, a 3DRU depth value may be selected, else a DFS value may be selected. If a DFS depth map has a hole in a pixel, a 3DRU depth may be selected and vice versa. Also, a hole mask may contain information about pixels where both a DFS and 3DRU depth map contain holes. Moreover, the combine depth component 556 produces a combined confidence map that may contain a confidence measure of the chosen depth map value.

In some aspects, a confidence measure of 3DRU depth may be based on number of samples contributing to that depth value. Additionally, a confidence measure of a DFS depth may be based on number of ambiguous matches during disparity calculation. In some instances, the higher the number of ambiguous matches may lower the confidence level.

Figure 6:
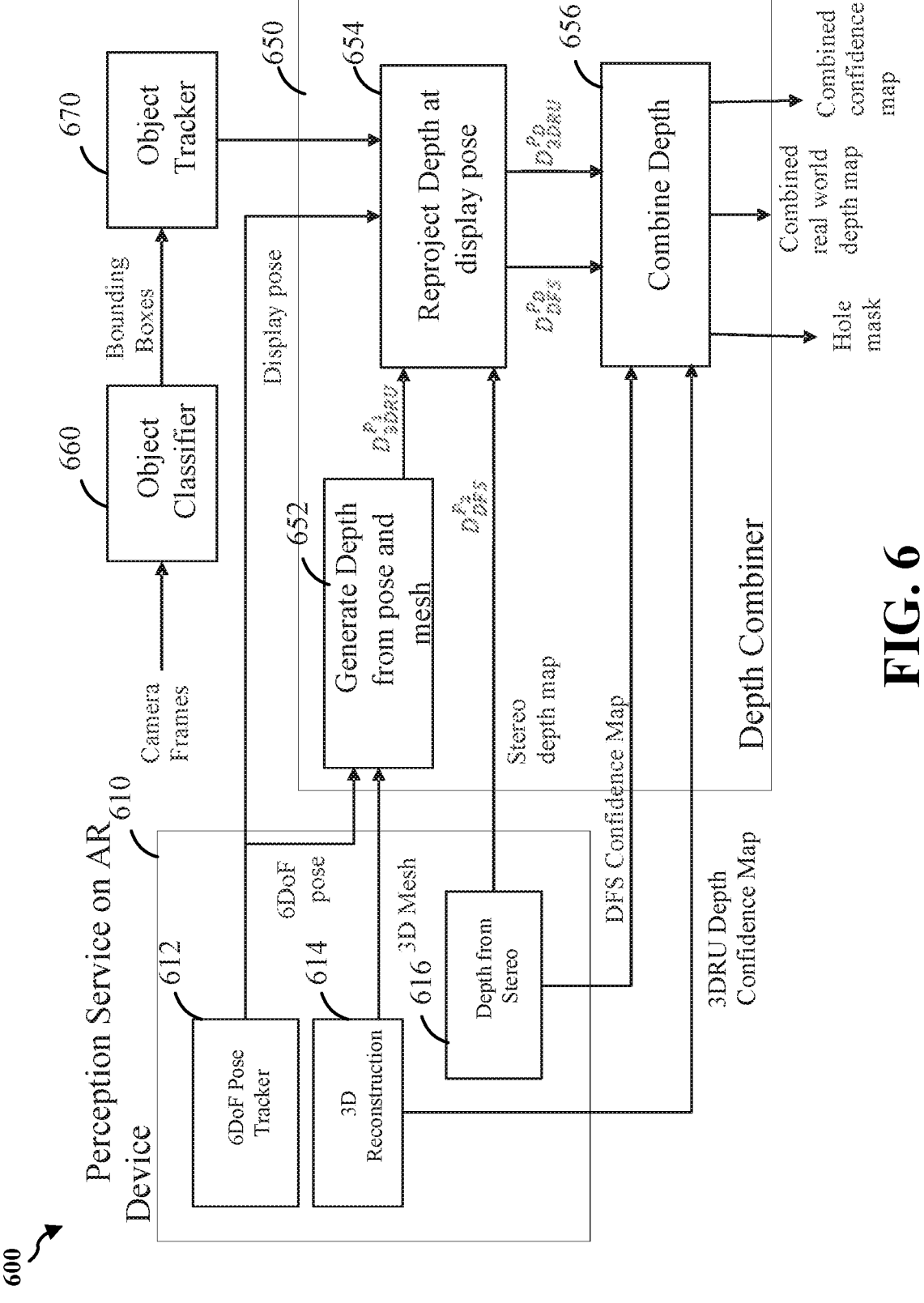
FIG. 6 illustrates an example diagram including an occlusion handling technique in accordance with one or more implementations of the present disclosure.

FIG. 6 illustrates diagram 600 including an occlusion handling technique in accordance with one or more implementations of the present disclosure. As shown in FIG. 6, diagram 600 includes a perception service on AR device 610 and a depth combiner 650. The perception service on AR device 610 includes a six-degree of freedom (6DoF) pose tracker 612, a 3D reconstruction component 614, and a DFS component 616. The depth combiner 650 includes a generate depth from pose and mesh component 652, a re-project depth at display pose component 654, and a combine depth component 656. The diagram 600 also includes an object classifier 660 and an object tracker 670. As shown in FIG. 6, the object classifier 660 may be utilized, which can take camera frames as input and produces bounding boxes for well-known real objects, e.g., a sofa, a chair, and/or a table. The object classifier 660 can be further extended to recognize objects, such as hands and people. In some aspects, the object tracker 670 can use the bounding boxes and track them across frames. Further, better prediction of depth maps can be obtained by combining the object tracker information to 3DRU and DFS depth, e.g., for dynamic real objects, at the re-project depth at display pose component 654.

Figure 7:
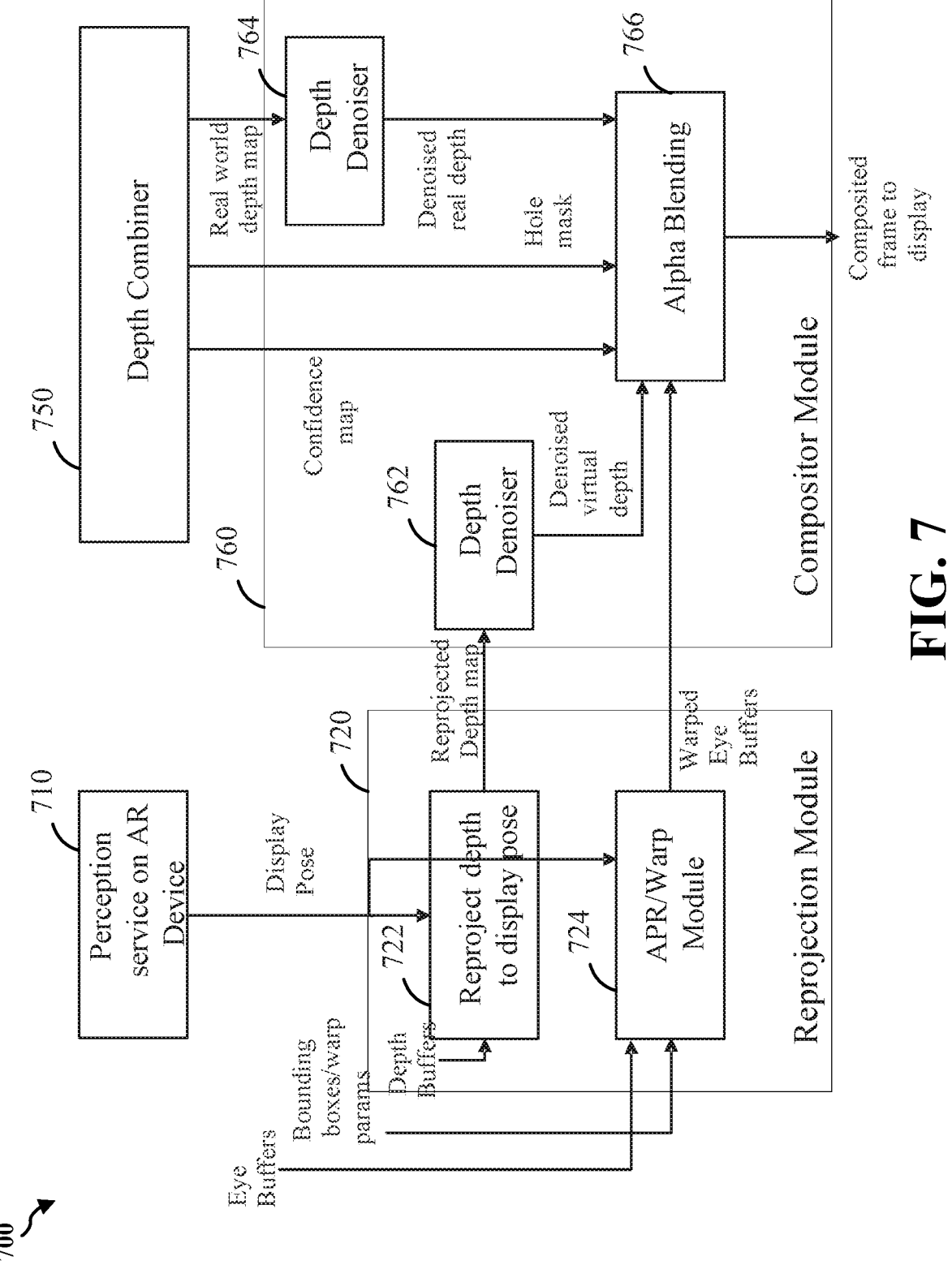
FIG. 7 illustrates an example diagram including an occlusion handling technique in accordance with one or more implementations of the present disclosure.

FIG. 7 illustrates diagram 700 including an occlusion handling technique in accordance with one or more implementations of the present disclosure. As shown in FIG. 7, diagram 700 includes a perception service on AR device component 710, a re-projection module 720, a depth combiner 750 and a compositor module 760. The re-projection module 720 includes a re-project depth to display pose component 722 and an asynchronous planar re-projection (APR) or warp module 724. The compositor module 760 includes one or more depth de-noisers 762, 764 and an alpha blending component 766. As shown in FIG. 7, the re-project depth to display pose component 722 of the re-projection module 720 may receive the display pose from a 6DoF tracker (e.g., 6DoF tracker 512 of FIG. 5) and depth buffers from an AR application (e.g., the AR application 310 of FIG. 3). The APR or warp module 724 can receive the display pose from a 6DoF tracker (e.g., 6DoF tracker 512 of FIG. 5), computed bounding boxes and warp parameters from a compute bounding box and warp parameters module (e.g., the compute bounding box and warp parameters module 330 of FIG. 3) and depth buffers from an AR application (e.g., the AR application 310 of FIG. 3). In this regard, the APR or warp module 724 can warp rendered eye buffers by asynchronous planar re-projection (APR) or a similar re-projection method. The re-projection module 720 may also re-project rendered depth buffer to the display pose. For instance, the re-project depth to display pose component 722 produces and provides a re-projected depth map to the depth de-noiser 762. In turn, the depth de-noiser 762 may produce a denoised virtual depth that is then provided to the alpha blending component 766. The alpha blending component 766 also may receive the warped eye buffers from the APR or warp module 724 and the re-projected depth buffers from the re-project depth to display pose component 722 and produce an augmented frame with occlusion rendering.

The depth combiner 750 provides a confidence map and a hole mask to the alpha blending component 766. The depth combiner 750 also provides a real-world depth map to the depth de-noiser 764. The depth de-noiser 764 can provide a denoised real depth map based on the real-world depth map. In some aspects, a re-projected rendered depth may have holes, which can be de-noised based on in-painting or a de-noiser. A combined real world depth map obtained from the depth combiner 750 can be refined further by the depth de-noiser 764. Additionally, alpha blending can be performed based on the combined confidence map obtained from the depth combiner 750. Alpha blending for hole pixels, e.g., obtained from a hole mask, can be performed based on a combined confidence map of neighboring valid pixels. As such, the alpha blending component 766 may produce a composited frame to send to a display.

Figure 8:
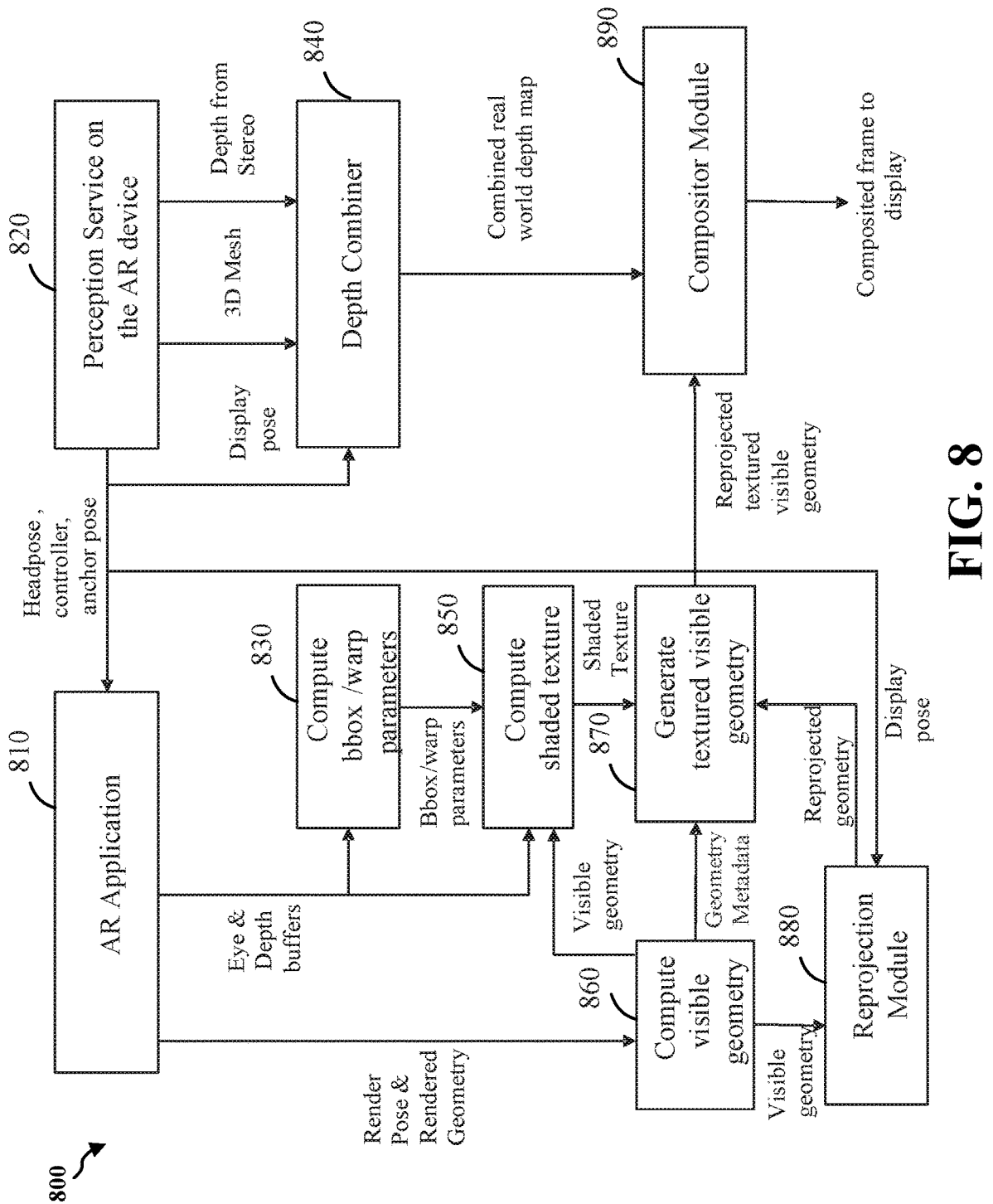
FIG. 8 illustrates an example diagram including an occlusion handling technique in accordance with one or more implementations of the present disclosure.

FIG. 8 illustrates diagram 800 including an occlusion handling technique in accordance with one or more implementations of the present disclosure. As shown in FIG. 8, diagram 800 includes an AR application component 810, a perception service on the AR device component 820, a compute bounding box and warp parameters component 830, a depth combiner 840, a compute shaded texture component 850, a compute visible geometry component 860, a generate textured visible geometry component 870, a re-projection module 880, and a compositor module 890.

As shown in FIG. 8, a game engine can generate visible geometry data, i.e., a collection of vertices or triangles, of a scene potentially from multiple predicted viewpoints with respect to a render pose. For example, the AR application component 810 can provide a render pose and rendered geometry to the compute visible geometry component 860 and eye and depth buffers to the compute bounding box and warp parameters component 830 and the compute shaded texture component 850. The compute visible geometry component 860 can provide a visible geometry to the compute shaded texture component 850 and the re-projection module 880. The compute visible geometry component 860 also provides a geometry metadata to the generate texture visible geometry component 870. The textures of visible geometry can be obtained from the eye buffers and bounding boxes, which can be dumped onto a shaded texture. The compute shaded texture component 850 provides the shaded texture to the generate textured visible geometry component 870. The geometry metadata can map the vertices and triangles to their corresponding location on shaded texture. Also, the re-projection module 880 may take visible geometry and re-project it to a display pose. The re-projection module 880 provides a re-projected geometry to the generate textured visible geometry component 870. The shaded visible geometry at display pose may be reconstructed on an AR device using the shaded texture and re-projected visible geometry mapping data of vertices and triangles. For example, the generate textured visible geometry component 870 provides the re-projected textured visible geometry to the compositor module 890. The depth combiner 840 provides a combined real-world depth map to the compositor module 890. Further, the compositor module 890 may use the re-projected vertices and combined real world depth map to resolve any occlusion.

Figure 9:
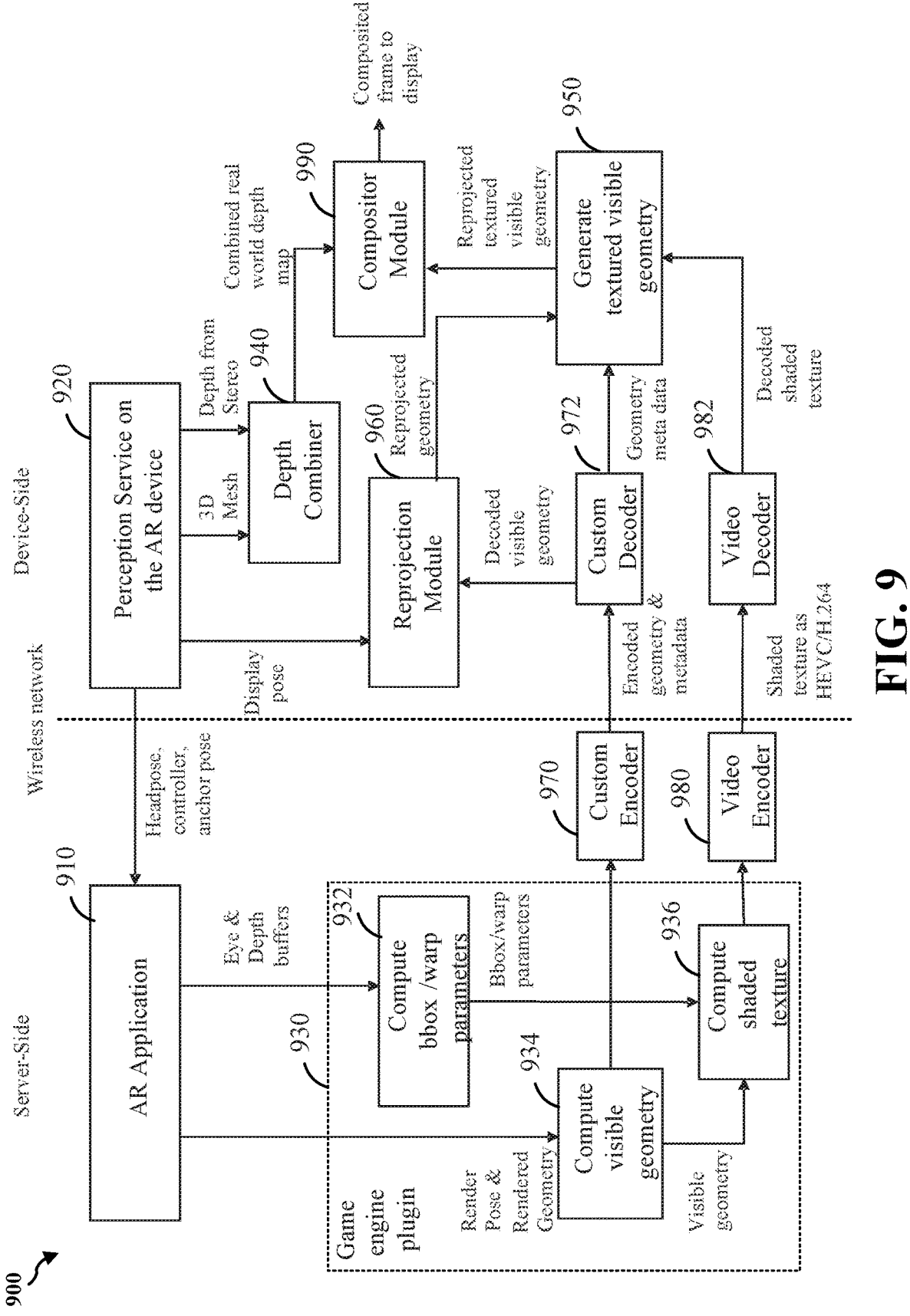
FIG. 9 illustrates an example diagram including an occlusion handling technique in accordance with one or more implementations of the present disclosure.

FIG. 9 illustrates diagram 900 including an occlusion handling technique in accordance with one or more implementations of the present disclosure. As shown in FIG. 9, diagram 900 includes an AR application component 910, a perception service on the AR device component 920, a game engine plugin module 930, a depth combiner 940, a generate textured visible geometry component 950, a re-projection module 960, a custom encoder 970, a custom decoder 972, a video encoder 980, a video decoder 982, and a compositor module 990. As shown in FIG. 9, in split AR use cases, the server may include the AR application component 910, the game engine plugin 930, the custom encoder 970, and video encoder 980. The game engine plugin module 930 includes a compute bounding box and warp parameters component 932, a compute visible geometry component 934, and a compute shaded texture component 936. The AR client device may include the perception service on the AR device component 920, the depth combiner 940, the generate textured visible geometry component 950, the custom decoder 972, the video decoder 982, re-projection module 960 and the compositor module 990.

As shown in FIG. 9, in split AR use cases, the geometry may be rendered on a server, e.g., a phone or edge server, and sent along with shaded texture to a AR client device connected by a wire or wireless connection to the server. The perception service on the AR device component 920 on the device-side can communicate a headpose, controller, or anchor pose to the AR application component 910 on the server-side via the wireless network. The AR application component 910 can send rendered pose and rendered geometry data to the compute visible geometry component 934. The compute visible geometry component 934 can send visible geometry data to the compute shaded texture component 936. The compute bounding box and warp parameters component 932 on the server-side may send bounding boxes and warp parameter metadata to the compute shaded texture component 936.

On the device side, the perception service on the AR device component 920 can provide the display pose to the re-projection module 960 and 3D mesh data along with DFS data to the depth combiner 940. The depth combiner 940 can provide a combined real-world depth map to the compositor module 990. The re-projection module 960 can provide a re-projected geometry to the generate textured visible geometry component 950.

Also, the video encoder 980 can send shaded texture as HEVC/H.264 data to the video decoder 982 via the wireless network. The shaded texture may be encoded with a high efficiency video coding (HEVC) or H.264 encoder and sent to AR client device over a network (e.g., the wireless network). The video decoder 982 can provide a decoded shaded texture to the compositor module 990.

The custom encoder 970 on the server-side may send encoded geometry and metadata to the custom decoder 972 on the device-side via the wireless network. The geometry and metadata can be encoded with the custom encoder 970 and sent over the network. Also, the visible geometry may be reconstructed, re-projected, and consumed by the compositor module 990 for occlusion rendering. For example, the generate textured visible geometry component 950 provides a re-projected textured visible geometry to the compositor module 990. As such, the compositor module 990 produces a compositor frame to send to a display.

In some cases, the renderer may not submit depth buffers, but as part of the game engine plugin 930, the depth may be determined from the left and right stereo eye buffers. In some instances, the present disclosure can include a method where eye-tracking data can be used to determine bounding boxes in focus and run better blending on those bounding boxes. Also, the present disclosure can include a method where a real-time semantic segmenter may be used to segment static and dynamic objects and generate a segmentation map. in some aspects, the segmentation map can be used in alpha blending to reinforce blending near edges of virtual and real objects.

Aspects of the present disclosure can include a number of different methods or apparatus. For instance, aspects of the present disclosure can include a method in the context of augmented reality applications where depth from stereo frames and depth from a 3D reconstructed mesh are combined to obtain more reliable depth map for better occlusion rendering. Also, aspects of the present disclosure can include a method in the context of augmented reality where rendered geometry data, i.e., sets of visible vertices and triangles, is shaded and re-projected to a display pose to be consumed by a compositor for occlusion rendering. Aspects of the present disclosure can also include a method in the context of split AR where a renderer, e.g., a phone or edge server, generates virtual scene depth, computes bounding boxes around virtual objects and sends encoded sampled depth textures of objects corresponding to bounding boxes to the AR device by a wired or wireless connection.

Aspects of the present disclosure can also include a method in the context of split AR where a renderer, e.g., a phone or edge server, sends encoded geometry, shaded texture and relevant metadata to an AR device for occlusion rendering. Further, aspects of the present disclosure can include a method where a renderer leverages motion vector texture in predicting depth of dynamic virtual objects on an AR device. Aspects of the present disclosure can also include a method where a real-time object classifier and object tracker can be used to reinforce depth maps obtained from stereo frames and 3D reconstructed mesh.

In some instances, aspects of the present disclosure can include a method where rendered depth buffers for computed bounding boxes are re-projected or predicted at the display pose. Aspects of the present disclosure can also include a method where a real world combined depth map computed from a 3DRU and DFS and rendered depth map are de-noised by a depth de-noiser or in-painting algorithm. Additionally, aspects of the present disclosure can include a method where pixels from a rendered eye buffer and real world frame are alpha blended based on a confidence measure of stereo depths and 3DRU depths. The smart blending of hole pixels can be performed based on a confidence of neighboring depths.

Figure 10:
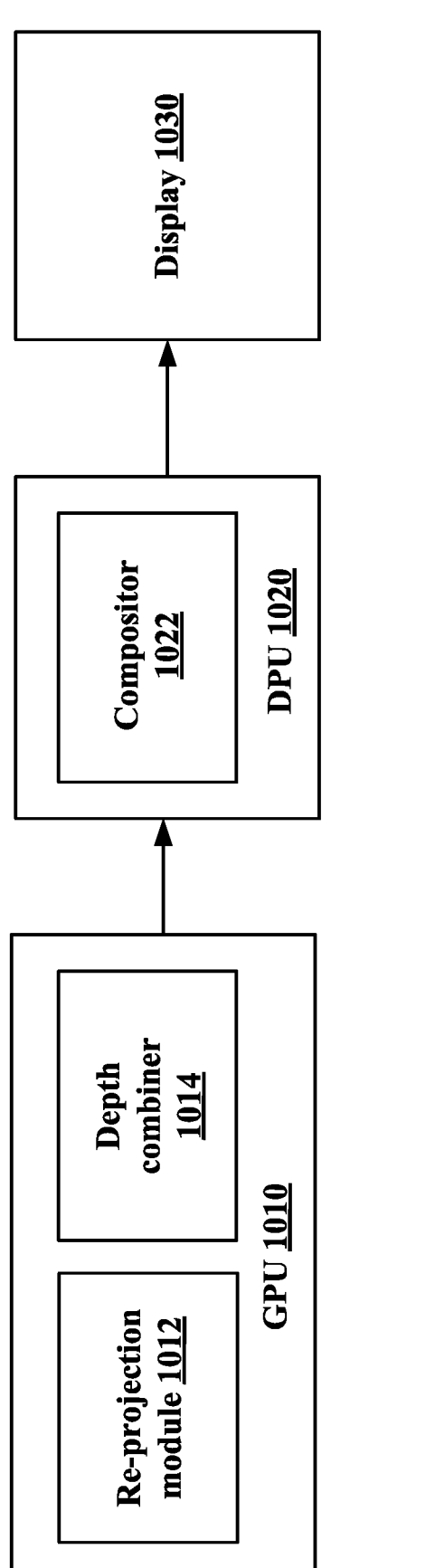
FIG. 10 illustrates an example diagram in accordance with one or more implementations of the present disclosure.

FIG. 10 illustrates an example diagram 1000 in accordance with one or more implementations of the present disclosure. More specifically, diagram 1000 includes a number of components for the occlusion handling techniques described herein. As shown in FIG. 10, diagram 1000 includes GPU 1010, re-projection module 1012, depth combiner 1014, DPU 1020, compositor 1022, and display 1030. As described herein, GPU 1010, re-projection module 1012, depth combiner 1014, DPU 1020, compositor 1022, and display 1030 can perform a number of different steps or processes, as described in connection with the examples in FIGS. 3-9, to perform occlusion handling techniques.

Figure 11:
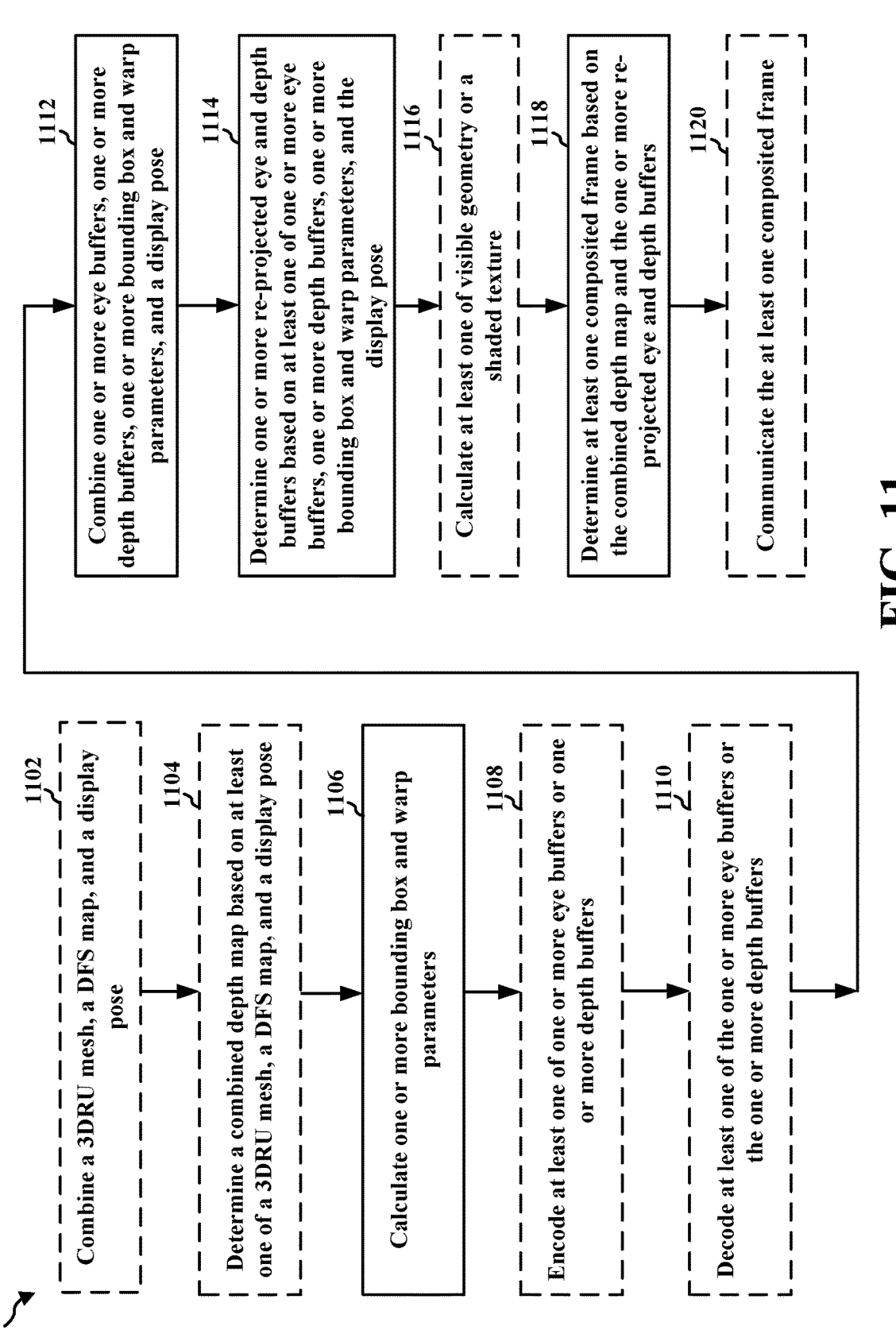
FIG. 11 illustrates an example flowchart of an example method in accordance with one or more implementations of the present disclosure.

FIG. 11 illustrates a flowchart 1100 of an example process in accordance with one or more implementations of the present disclosure. The method may be performed by an apparatus such as a GPU, a CPU, a DPU, a re-projection module, a depth combiner, a compositor, a display, or an apparatus for graphics processing. According to various aspects, one or more of the illustrated operations of the process may be omitted, transposed, and/or contemporaneously performed. Optional aspects are illustrated with a dashed line.

At 1102, the apparatus may combine a three-dimensional reconstruction and understanding mesh, a depth from stereo map, and a display pose, as described in connection with the examples in FIGS. 3-10. In some aspects, the 3DRU mesh, the DFS map, and the display pose may be combined in a depth combiner, as described in connection with the examples in FIGS. 3-10.

At 1104, the apparatus may determine a combined depth map based on at least one of the 3DRU mesh, the DFS map, and the display pose, as described in connection with the examples in FIGS. 3-10. In some aspects, the combined depth map may be determined by a GPU or a DPU, as described in connection with the examples in FIGS. 3-10.

At 1106, the apparatus may calculate one or more bounding box and warp parameters, as described in connection with the examples in FIGS. 3-10.

At 1108, the apparatus may encode at least one of one or more eye buffers or one or more depth buffers, as described in connection with the examples in FIGS. 3-10.

At 1110, the apparatus may decode at least one of one or more eye buffers or one or more depth buffers, as described in connection with the examples in FIGS. 3-10.

At 1112, the apparatus may combine the one or more eye buffers, the one or more depth buffers, the one or more bounding box and warp parameters, and the display pose, as described in connection with the examples in FIGS. 3-10. In some aspects, the one or more eye buffers, the one or more depth buffers, the one or more bounding box and warp parameters, and the display pose may be combined in a re-projection module, as described in connection with the examples in FIGS. 3-10.

At 1114, the apparatus may determine one or more re-projected eye and depth buffers based on at least one of the one or more eye buffers, the one or more depth buffers, the one or more bounding box and warp parameters, and the display pose, as described in connection with the examples in FIGS. 3-10. In some instances, the one or more re-projected eye and depth buffers may be further determined based on at least one of the visible geometry or the shaded texture, as described in connection with the examples in FIGS. 3-10. Also, the one or more re-projected eye and depth buffers may be determined by a GPU or a DPU, as described in connection with the examples in FIGS. 3-10.

At 1116, the apparatus may calculate at least one of visible geometry or a shaded texture, as described in connection with the examples in FIGS. 3-10.

At 1118, the apparatus may determine the at least one composited frame based on the combined depth map and the one or more re-projected eye and depth buffers, as described in connection with the examples in FIGS. 3-10. In some aspects, the at least one composited frame may be further determined based on at least one of a hole mask, a confidence map, and de-noised virtual depth, as described in connection with the examples in FIGS. 3-10. Also, the at least one composited frame may be determined in a compositor module, as described in connection with the examples in FIGS. 3-10.

At 1120, the apparatus may communicate at least one composited frame, where the at least one composited frame may be based on the combined depth map and the one or more re-projected eye and depth buffers, as described in connection with the examples in FIGS. 3-10. In some aspects, the at least one composited frame may be communicated to a display, as described in connection with the examples in FIGS. 3-10.

In one configuration, a method or apparatus for graphics processing is provided. The apparatus may be a GPU, a CPU, a DPU, a re-projection module, a depth combiner, a compositor, a display, or some other processor that can perform graphics processing. In one aspect, the apparatus may be the processing unit 120 within the device 104, or may be some other hardware within device 104 or another device. The apparatus may include means for determining a combined depth map based on at least one of a three-dimensional reconstruction and understanding mesh, a depth from stereo (DFS) map, and a display pose. The apparatus may also include means for determining one or more re-projected eye and depth buffers based on at least one of one or more eye buffers, one or more depth buffers, one or more bounding box and warp parameters, and the display pose. The apparatus may also include means for communicating at least one composited frame, the at least one composited frame being based on the combined depth map and the one or more re-projected eye and depth buffers. The apparatus may also include means for determining the at least one composited frame based on the combined depth map and the one or more re-projected eye and depth buffers. The apparatus may also include means for combining the 3DRU mesh, the DFS map, and the display pose. The apparatus may also include means for combining the one or more eye buffers, the one or more depth buffers, the one or more bounding box and warp parameters, and the display pose. The apparatus may also include means for calculating the one or more bounding box and warp parameters. The apparatus may also include means for encoding at least one of the one or more eye buffers or the one or more depth buffers. The apparatus may also include means for decoding at least one of the one or more eye buffers or the one or more depth buffers. The apparatus may also include means for calculating at least one of visible geometry or a shaded texture.

The subject matter described herein can be implemented to realize one or more benefits or advantages. For instance, the described graphics processing techniques can be used by GPU, a CPU, a DPU, a re-projection module, a depth combiner, a compositor, a display, or some other processor that can perform graphics processing to implement the occlusion handling techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can more accurately determine occlusions or visible primitives during occlusion computations.

The following aspects are illustrative only and may be combined with aspects of other embodiments or teachings described herein, without limitation.

Aspect 1 is a method of graphics processing that includes determining a combined depth map based on at least one of a three-dimensional (3D) reconstruction and understanding (3DRU) mesh, a depth from stereo (DFS) map, and a display pose; determining one or more re-projected eye and depth buffers based on at least one of one or more eye buffers, one or more depth buffers, one or more bounding box and warp parameters, and the display pose; and sending at least one composited frame, the at least one composited frame being based on the combined depth map and the one or more re-projected eye and depth buffers.

In Aspect 2, the method of Aspect 1 further includes determining the at least one composited frame based on the combined depth map and the one or more re-projected eye and depth buffers.

In Aspect 3, the method of Aspect 1 or Aspect 2 further includes that the at least one composited frame is further determined based on at least one of a hole mask, a confidence map, and de-noised virtual depth.

In Aspect 4, the method of Aspects 1 or Aspect 2 further includes that the at least one composited frame is further determined in a compositor module.

In Aspect 5, the method of any of Aspects 1-4 further includes performing alpha blending based on the confidence map.

In Aspect 6, the method of any of Aspects 1-5 further includes combining the 3DRU mesh, the DFS map, and the display pose.

In Aspect 7, the method of any of Aspects 1-6 further includes that the 3DRU mesh, the DFS map, and the display pose are combined in a depth combiner.

In Aspect 8, the method of any of Aspects 1-7 further includes combining the one or more eye buffers, the one or more depth buffers, the one or more bounding box and warp parameters, and the display pose, wherein the one or more eye buffers, the one or more depth buffers, the one or more bounding box and warp parameters, and the display pose are combined in a re-projection module.

In Aspect 9, the method of any of Aspects 1-8 further includes calculating the one or more bounding box and warp parameters.

In Aspect 10, the method of any of Aspects 1-9 further includes calculating that the one or more bounding box and warp parameters are calculated based on eye tracking data.

In Aspect 11, the method of any of Aspects 1-10 further includes receiving the one or more bounding box and warp parameters from a server.

In Aspect 12, the method of any of Aspects 1-11 further includes encoding at least one of the one or more eye buffers or the one or more depth buffers.

In Aspect 13, the method of any of Aspects 1-12 further includes receiving one or more of encoded eye buffers or one or more encoded depth buffers from a server.

In Aspect 14, the method of Aspect 13 further includes decoding at least one of the one or more eye encoded buffers or the one or more encoded depth buffers.

In Aspect 15, the method of any of Aspects 1-14 further includes calculating at least one of a visible geometry or a shaded texture.

In Aspect 16, the method of any of Aspects 1-15 further includes that the one or more re-projected eye and depth buffers are further determined based on at least one of the visible geometry or the shaded texture.

In Aspect 17, the method of any of Aspects 1-16 further includes receiving at least one of a visible geometry or a shaded texture from a server.

In Aspect 18, the method of any of Aspects 1-17 further includes that the at least one composited frame is communicated to a display.

In Aspect 19, the method of any of Aspects 1-18 further includes that the combined depth map is determined by a graphics processing unit or a display processing unit, wherein the one or more re-projected eye and depth buffers are determined by a GPU or a DPU.

In Aspect 20, the method of any of Aspects 1-19 further includes that the determining the combined depth map comprises combining object tracker information to the 3DRU and the DFS map for dynamic objects.

In Aspect 21, the method of any of Aspects 1-20 further includes generating a sampled depth texture based on left and right stereo eye buffers.

In Aspect 22, the method of any of Aspects 1-21 further includes generating a segmentation map by segmenting static and dynamic objects, and performing alpha blending with the segmentation map to reinforce blending proximate to edges of virtual and real objects.

Aspect 23 is a device including one or more processors and one or more memories in electronic communication with the one or more processors storing instructions executable by the one or more processors to cause a system or an apparatus to implement a method as in any of Aspects 1 to 22.

Aspect 24 is a system or apparatus including means for implementing a method or realizing an apparatus as in any of Aspects 1 to 22.

Aspect 25 is a non-transitory computer-readable medium storing instructions executable by one or more processors to cause the one or more processors to implement a method as in any of Aspects 1 to 22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. In accordance with the present disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout the present disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout the present disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in the present disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of the present disclosure may be implemented in a wide variety of devices or apparatuses, including a wireless handset, an integrated circuit (IC) or a set of ICs, e.g., a chip set. Various components, modules or units are described in the present disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

Various examples have been described. These and other examples are within the scope of the following claims.

What is claimed is:

1. A method of graphics processing, comprising:
   determining a combined depth map based on a depth from a three-dimensional (3D) reconstruction and understanding (3DRU) mesh, a depth from stereo (DFS) map, and a display pose;
   determining one or more re-projected eye and depth buffers based on at least one of one or more eye buffers, one or more depth buffers, one or more bounding box and warp parameters, and the display pose;
   determining at least one composited frame based on the combined depth map and the one or more re-projected eye and depth buffers; and
   sending the at least one composited frame to a display.

2. The method of claim 1, wherein the at least one composited frame is determined in a compositor module.

3. The method of claim 2, wherein the at least one composited frame is further determined based on at least one of a hole mask, a confidence map, and de-noised virtual depth.

4. The method of claim 3, further comprising performing alpha blending based on the confidence map.

5. The method of claim 1, further comprising combining the depth from the 3DRU mesh, the DFS map, and the display pose, wherein the depth from the 3DRU mesh, the DFS map, and the display pose are combined in a depth combiner.

6. The method of claim 1, further comprising:
   combining the one or more eye buffers, the one or more depth buffers, the one or more bounding box and warp parameters, and the display pose,
   wherein the one or more eye buffers, the one or more depth buffers, the one or more bounding box and warp parameters, and the display pose are combined in a re-projection module.

7. The method of claim 1, further comprising calculating the one or more bounding box and warp parameters.

8. The method of claim 7, wherein the one or more bounding box and warp parameters are calculated based on eye tracking data.

9. The method of claim 1, further comprising receiving the one or more bounding box and warp parameters from a server.

10. The method of claim 1, further comprising encoding at least one of the one or more eye buffers or the one or more depth buffers.

11. The method of claim 1, further comprising receiving one or more of encoded eye buffers or one or more encoded depth buffers from a server, further comprising decoding at least one of the one or more encoded eye buffers or the one or more encoded depth buffers.

12. The method of claim 1, further comprising calculating at least one of a visible geometry or a shaded texture.

13. The method of claim 12, wherein the one or more re-projected eye and depth buffers are further determined based on at least one of the visible geometry or the shaded texture.

14. The method of claim 1, further comprising receiving at least one of a visible geometry or a shaded texture from a server.

15. The method of claim 1, wherein the combined depth map is determined by a graphics processing unit (GPU) or a display processing unit (DPU), wherein the one or more re-projected eye and depth buffers are determined by a GPU or a DPU.

16. The method of claim 1, wherein the determining the combined depth map comprises combining object tracker information to the 3DRU and the DFS map for dynamic objects.

17. The method of claim 1, further comprising generating a sampled depth texture based on left and right stereo eye buffers.

18. The method of claim 1, further comprising:
generating a segmentation map by segmenting static and dynamic objects; and
performing alpha blending with the segmentation map to reinforce blending proximate to edges of virtual and real objects.

19. An apparatus for graphics processing, comprising:
a memory; and
at least one processor coupled to the memory and configured to:
determine a combined depth map based on a depth from a three-dimensional (3D) reconstruction and understanding (3DRU) mesh, a depth from stereo (DFS) map, and a display pose;
determine one or more re-projected eye and depth buffers based on at least one of one or more eye buffers, one or more depth buffers, one or more bounding box and warp parameters, and the display pose;
determining at least one composited frame based on the combined depth map and the one or more re-projected eye and depth buffers; and
communicate the at least one composited frame.

20. The apparatus of claim 19, wherein the at least one composited frame is further determined based on at least one of a hole mask, a confidence map, and de-noised virtual depth.

21. The apparatus of claim 20, wherein the at least one processor is further configured to perform alpha blending based on the confidence map, wherein the at least one composited frame is determined in a compositor module.

22. The apparatus of claim 19, wherein the at least one processor is further configured to combine the depth from the 3DRU mesh, the DFS map, and the display pose, wherein the depth from the 3DRU mesh, the DFS map, and the display pose are combined in a depth combiner.

23. The apparatus of claim 19, wherein the at least one processor is further configured to:
combine the one or more eye buffers, the one or more depth buffers, the one or more bounding box and warp parameters, and the display pose,
wherein the one or more eye buffers, the one or more depth buffers, the one or more bounding box and warp parameters, and the display pose are combined in a re-projection module.

24. The apparatus of claim 19, wherein the at least one processor is further configured to calculate the one or more bounding box and warp parameters.

25. The apparatus of claim 19, wherein the at least one processor is further configured to encode at least one of the one or more eye buffers or the one or more depth buffers.

26. The apparatus of claim 25, wherein the at least one processor is further configured to decode at least one of the one or more eye buffers or the one or more depth buffers.

27. The apparatus of claim 19, wherein the at least one processor is further configured to calculate at least one of visible geometry or a shaded texture.

28. The apparatus of claim 27, wherein the one or more re-projected eye and depth buffers are further determined based on at least one of the visible geometry or the shaded texture.

29. An apparatus for graphics processing, comprising:
means for determining a combined depth map based on a depth from a three-dimensional (3D) reconstruction and understanding (3DRU) mesh, a depth from stereo (DFS) map, and a display pose;
means for determining one or more re-projected eye and depth buffers based on at least one of one or more eye buffers, one or more depth buffers, one or more bounding box and warp parameters, and the display pose;
means for determining at least one composited frame based on the combined depth map and the one or more re-projected eye and depth buffers; and
means for communicating at the least one composited frame.

30. A non-transitory computer-readable medium storing computer executable code for graphics processing, the code when executed by a processor, causes the processor to:
determine a combined depth map based on a depth from a three-dimensional (3D) reconstruction and understanding (3DRU) mesh, a depth from stereo (DFS) map, and a display pose;
determine one or more re-projected eye and depth buffers based on at least one of one or more eye buffers, one or more depth buffers, one or more bounding box and warp parameters, and the display pose;
determining at least one composited frame based on the combined depth map and the one or more re-projected eye and depth buffers; and
communicate the at least one composited frame.

* * * * *